United States Patent Office 3,392,777
Patented July 16, 1968

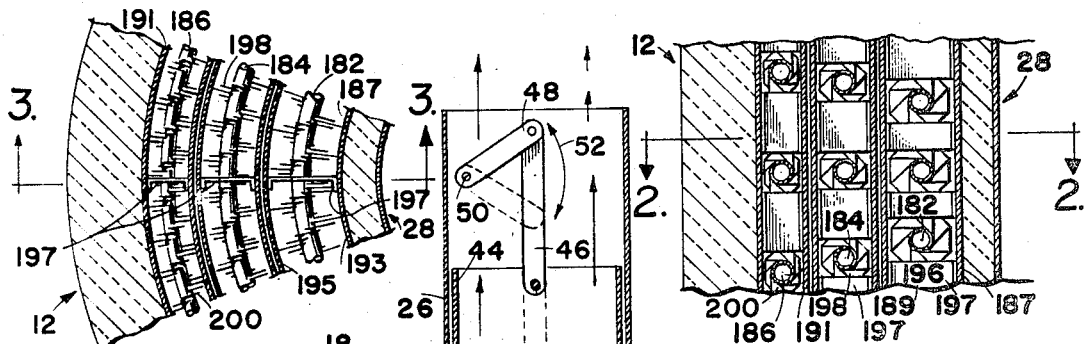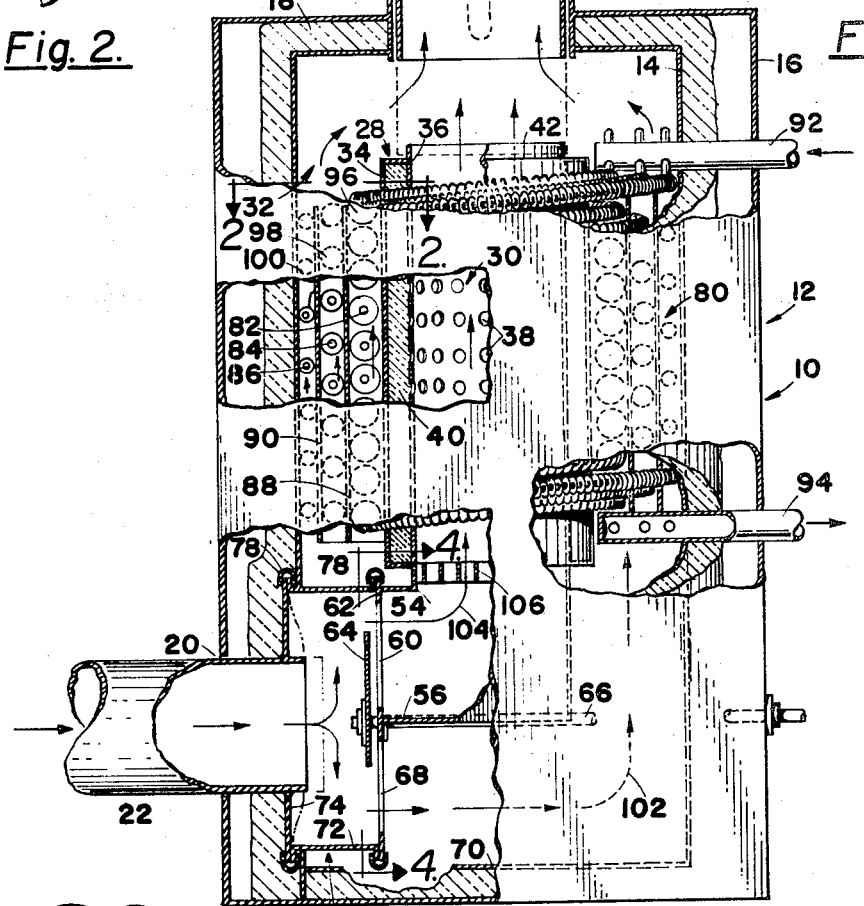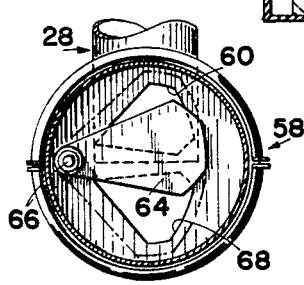

3,392,777
HEAT EXCHANGER
John W. Edgemond, Jr., Oakland, and John L. Boyen, Orinda, Calif., assignors, by mesne assignments, to Vapor Corporation, Chicago, Ill., a corporation of Delaware
Filed Apr. 22, 1966, Ser. No. 544,513
14 Claims. (Cl. 165—35)

ABSTRACT OF THE DISCLOSURE

A heat exchanger having a housing provided with a fluid inlet duct and a fluid outlet duct with a tubular column disposed within the housing to define inner and outer fluid passages within the housing in communication with the ducts. At least one coiled pipe is in the outer fluid passage in heat exchange relationship to fluid flow therethrough. Means is provided to define fluid inlets for the passages and valve means adjacent to the inlets selectively control the fluid flow therethrough from the inlet duct of the housing.

---

This invention relates to improvements in heat exchangers of the type for use with large volumes of hot pressurized gases and, more particularly, to a heat exchanger having alternate fluid flow paths therethrough.

The present invention resides in heat exchanger apparatus having a pair of concentric, independent fluid passages therethrough, one of the passages having coiled fluid delivery pipe therein in heat exchange relationship to a fluid flowing therethrough. A selectively actuatable valve adjacent to and coupled with the inlets of the passages permits a volume of hot, pressurized gases to flow into and through the passage containing the coiled pipe in heat exchange relationship to a fluid flowing through the pipe. In the alternative, the valve directs the gases into the other passage in bypassing relationship to the first mentioned passage. In this way, heat transfer to the fluid in the pipe is interrupted and thereby controlled as desired.

In a preferred form of the aparatus, an inner column is disposed within a housing having a fluid inlet duct and a fluid outlet duct. A number of fluid carrying pipes are disposed in the housing about the column, each pipe extending along a helical path and the paths being concentric to each other. Heat transfer fins are provided on the pipes to facilitate the heat exchange between the fluids therein and the hot gases flowing past the pipes and through the housing toward the outlet duct. The pipes are of substantially the same length and diameter so that the fluids therein are preferably heated to the same degree. The fins defined extended surfaces and the heights of these surfaces between adjacent convolutions of the various pipes decrease as the outer pipe is approached to provide for the aforesaid uniformity in heat transfer.

The column is provided with sound reducing structure therein which muffles the noise created by the unrestricted flow of the gases therethrough when such gases bypass the passage containing the pipes. Means is provided to directly connect the column with the outlet duct to prevent reverse flow of the gases into the housing. This structure isolates the coils from the bypassed gas.

In heat recovery systems for industrial use, large volumes of high temperature, pressurized gases are directed through heat exchangers in heat transfer relationship to other fluids, whereby the heat energy imparted to such other fluids can be utilized in a profitable manner rather than being totally lost by exhausting the gases to the atmosphere. In employing a heat exchanger in this manner, it is desirable and oftentimes necessary to have substantially complete control of fluid flow therethrough not only to control the transferred heat energy but also to comply with established safety requirements in view of the elevated temperatures and pressures of the gases. The apparatus of this invention provides this control by having a pair of alternate fluid flow paths, one of the paths having heat transfer conduit structure therein while the other path is unrestricted and open to the atmosphere. Thus, the valve associated with the input of these paths or passages allows for selective transition between fluid flow along one path and fluid flow along the other path. The gases thus may move along one path in heat exchange relationship to a fluid flowing through the conduit or may be exhausted to the atmosphere when the heat energy imparted to the fluid has attained a maximum value. Moreover, the valve is of the variable orifice type to allow for simultaneously directing portions of the flow of gases along both paths. In this way, greater control of the gases is assured and sensitive variations in the heat energy imparted in the heat transfer process can be realized.

It is, therefore, the primary object of this invention to provide a valve controlled heat exchanger which has a pair of alternate fluid flow passages therethrough and heat transfer structure across one of the passages, whereby the heat exchanger provides substantially complete control for the flow of hot, pressurized gases therethrough by directing the gases either through the first passage for recovery of heat energy therefrom or through the other passage for exhaustion to the atmosphere when heat recovery is not deemed necesary or desirable.

Another object of this invention is the provision of a heat exchanger of the type described which has a variable orifice valve associated therewith, whereby the hot gases may simultaneously flow through both passages as well as through each passage alone to thereby assure more sensitive control of the heat energy recovered from the gases as they flow through the heat exchanger.

Still a further object of the invention is the provision of a heat exchanger of the aforesaid character which has a central column defining the passage for exhausting the gases to the atmosphere and wherein the column is provided with thermal insulation and sound reducing structure so that the passages will remain out of thermal interchange relationship with the other passage and noise created by the flow of the gases through the column will be muffled.

Yet another object of the present invention is the provision of a heat exchanger having a number of concentrically disposed fluid carrying pipes within a passage for receiving hot, pressurized gases wherein the pipes are substantially of the same length and diameter notwithstanding the relative concentric disposition thereof within the passage to thereby assure substantially uniform heating of the fluids in the pipes by the gases flowing through the passage.

Other objects of this invention will become apparent as the specification progresses, reference being had to the accompanying drawing wherein:

FIG. 1 is a side elevational view of the heat exchanger broken away and partly in section to illustrate details of construction;

FIG. 2 is a cross sectional view taken along line 2—2 of FIG. 1 and illustrating a modified heat transfer structure;

FIG. 3 is a cross sectional view taken along line 3—3 of FIG. 1; and

FIG. 4 is a cross sectional view taken along line 4—4 of FIG. 1.

A preferred form of the heat exchanger is illustrated in FIG. 1 and broadly denoted by the numeral 10. Exchanger 10 includes a closed housing 12 having an inner wall 14 and an outer wall 16 between which is a mass 18 of heat insulating material of any suitable type. Housing 12 has an inlet opening 20 through which a fluid inlet duct 22 extends. Housing 12 also has an outlet opening 24 through which a fluid outlet duct 26 extends. Duct 22 may be coupled in any suitable manner to a source of hot, pressurized gases, such as the discharge outlet of an electrical power generating turbine or the like. Duct 26 may be coupled to a fluid receiving device but, as illustrated in FIG. 1, provides a fluid discharge to the atmosphere surrounding heat exchanger 10. Thus, duct 22 provides the means for admitting fluid under pressure into housing 12 and duct 26 provides the exit means for such fluid.

A central column 28 is disposed within housing 12 in axial alignment with duct 26. Suitable mounting structure (not shown) is utilized to maintain column 28 in a fixed, rigid position spaced inwardly from the inner surface of wall 14. The interior of column 28 and the space between it and wall 14 therefore define concentric fluid passages 30 and 32 respectively coupled at their inlet and outlet ends to ducts 22 and 26 respectively in a manner hereinafter described.

Column 28 includes a pair of spaced, concentric, tubular walls 34 and 36, wall 34 being imperforate and wall 36 being provided with a plurality of holes 38 therethrough. A mass 40 of thermal insulating material is disposed in the space between walls 34 and 36 and serves with wall 36 as a sound absorbing device, whereby the noise of hot, pressurized gases flowing through passage 30 is muffled.

The upper end 42 of wall 36 is spaced below the lower end of duct 26 and is in fluid communication with the latter as well as with the upper end of the interior of housing 12. Thus, the upper ends of the passages 30 and 32 are normally in fluid communication with each other. A reciprocal sleeve 44 is carried within duct 26 by an arm 46 pivotally coupled to an arm 48 rigid to a horizontal shaft 50. The rotation of shaft 50 in opposed directions through the limited arc defined by arrow 52 causes sleeve 44 to be raised and lowered and thereby movable into and out of the dashed line position of FIG. 1. In this way, sleeve 44 closes off duct 26 to fluid flowing through passage 32. Thus, reverse flow of hot gases into housing 12 from passage 30 is prevented. A suitable control device is coupled to shaft 50 for rotating the same.

The lower end 54 of wall 36 is coupled to a lateral tubular extension 56 which, in turn, is coupled to a fluid valve 58 shown in FIGS. 1 and 4. Extension 56 is aligned with opening or orifice 60 of valve 58, the latter being formed in an end plate 62 and having a valve member 64 rotatably mounted on a shaft 66 journaled in plate 62. Plate 62 also has another orifice 68 therethrough which is aligned with a second, lateral tubular extension 70 which is out of fluid communication with extension 56 but communicates with passage 32. Valve 58 has a cylindrical housing 72 which has plate 62 across one end thereof and a flexible plate 74 across its opposite end. Plates 66 and 74 are preferably secured to housing 72 by transversely V-shaped clamping rings 76 and 78 respectively to facilitate the installation of valve 58 within housing 12.

Valve member 64 is selectively movable from a first position completely obstructing opening 60 and permitting opening 68 to be fully unobstructed to a second position completely blocking opening 68 but spaced from opening 60. Member 64 may also move into and out of intermediate operative positions if fluid flow simultaneously through openings 62 and 68 is desired.

Heat transfer structure 80 is provided in passage 32 about column 28 for recovering at least a portion of the heat energy in hot gases flowing through passage 32 when valve 58 is oriented to effect such flow. Structure 80 includes a number of coiled pipes 82, 84 and 86, the convolutions of pipe 84 surrounding pipe 82 and the convolutions of pipe 86 surrounding pipe 84. A pair of tubular, imperforate partitions 88 and 90 are disposed on opposed sides of pipe 84 to separate passage 32 into three independent conduits each having a coiled pipe therein.

The inlet ends of pipes 82, 84 and 86 are coupled to a manifold 92 which extends through housing 12 adjacent to the upper end thereof. The outlet ends of the pipes are coupled to another manifold 94 below manifold 92 and also extending outwardly from housing 12. Manifold 92 is adapted to be coupled to a source of fluid and manifold 94 is adapted to be connected to some type of fluid receptacle. Suitable valve structure at the inlets and outlets of pipes 82, 84 and 86 could be provided if greater control of fluid flow therethrough is desired.

Since the above pipes have a common connection to manifolds 92 and 94, it is desirable that the fluids in the various pipes be uniformly heated to assure smooth flow outwardly of heat exchanger 10. To this end, pipes 82, 84 and 86 are of substantially the same length and cross section and the spacing between the convolutions of each pipe is different from that of the adjacent pipe. For instance, the convolutions of pipe 82 are closer together than the convolutions of pipe 84 and the convolutions of pipe 86 are further apart than the convolutions of pipe 84. Such spacing accounts for the variations in the diameters of the pipe convolutions.

To facilitate heat transfer, pipes 82, 84 and 86 are provided with heat transfer fins 96, 98 and 100. Each fin 96 has a greater effective gas passage area than each fin 98; similarly, each fin 98 has a greater effective gas passage area than each fin 100. The purpose of varying the effective gas passage areas of the fins is to maintain the heat transfer to the pipe substantially uniform. The conduit containing pipe 86 has a greater volume than the other two conduits and the conduit containing pipe 84 has a greater volume than the conduit containing pipe 82. By progressively decreasing the gas passage areas of the heat transfer fins as the outer conduit is approached the heat transfer is maintained uniform as a heat transfer fluid flows simultaneously through the conduits. Another reason for this technique is to obtain substantially equal gas pressure drop through each gas passage.

Another form of heat transfer structure suitable for use with heat exchanger 10 is illustrated in FIGS. 2 and 3 and includes pipes 182, 184 and 186 disposed within tubular members 187, 189 and 191 respectively. Each of the aforesaid tubular members includes a pair of spaced, interconnected inner and outer walls 193 and 195, each member and its corresponding pipe defining a complete unit which is concentric and movable relative to an adjacent unit. Thus, the units present modules which are removably disposed within housing 12 and permit replacement of the pipes when such is deemed desirable or necessary. The modules are open at their ends to define fluid receiving conduits therethrough. These conduits correspond to the conduits mentioned above with respect to the spaces formed by partitions 88 and 90.

Segmented heat transfer fins 196, 198 and 200 as shown in FIGS. 2 and 3 may be used in lieu of annular fins of the type shown in FIG. 1 on pipes 182, 184 and 186 respectively. Here again, the fins on pipe 182 have a greater effective area than the fins on pipes 184 and 186; similarly, the fins on pipe 184 have a greater effective area than the fins on pipe 186. The purpose of these fin variations is to assure uniform heat transfer to the pipes. Also, pipes 182, 184 and 186 are of the same length and cross section for the same purpose and FIG. 3 illustrates the variations in the convolution spacing of the pipes.

In FIG. 2, a plurality of baffles is provided for each of the members 187, 189 and 191, the baffles extending between corresponding walls 193 and 195 transversely of the helical path of the corresponding pipe. The purpose of baffles 197 is to prevent fluids from flowing along the helical path between convolutions of the pipe and to direct the fluid transversely of the pipe through the heat transfer fins thereof. Baffles 197 are positioned at intervals along the helical path of corresponding pipes and such baffle structure may be employed with partitions 88 and 90 to accomplish the same purpose. In the latter case, the baffles would extend between the partitions for the intermediate pipe 84 and would extend outwardly from the partitions to adjacent structure for pipes 82 and 86.

In use, exchanger 10 is positioned adjacent to a source of pressurized gases and duct 22 is connected to this source. Manifolds 92 and 94 are connected to a fluid distribution system. For instance, manifold 94 can be coupled to a tank for containing hot water and manifold 92 could be connected to the load supplied by the water tank. The tank and load would comprise a hot water heating system of the type oftentimes used for heating buildings or the like. For purposes of illustrating the operation of heat exchanger 10, it will be assumed that water flows through manifold 92 and that the exhaust gases of a turbine flow through duct 22.

Valve 58 is set to be predetermined operating condition with its valve member 64 in a certain position relative to openings 60 and 68. This is accomplished by rotating valve 66 by any suitable power device, such as a hydraulic motor or the like. The power device itself is automatically controlled by a suitable control and is responsive to either temperature or pressure as required.

When it is desired to utilize the gases to heat water in pipes 82, 84 and 86, valve member 64 is rotated into blocking relationship to opening 60 so that all the gases will flow into passage 32 as denoted by the arrow 102. The gases will flow transversely of the pipes and axially of column 28 so that heat will be transferred from the gases to the pipes either directly or through the fins 96, 98 and 100. The water flowing through the pipes will be heated by virtue of the heat energy imparted thereto and will flow outwardly of housing 12 through manifold 94 to the hot water tank which supplies the load connected to manifold 92. The gases will exhaust from passage 32 into duct 26 and then into the atmosphere. In this way, recovery of the heat energy of the gases is assured, the amount by which such energy is recovered being determined by the length of the path along which the gases flow.

When it is desired to interrupt the heat transfer to the water, valve member 64 is rotated so that it blocks opening 68 and permits unrestricted flow through opening 60. The gases then move along a path denoted by arrow 104 into and through column 28 and finally outwardly thereof through duct 26. A grid 106 can be utilized at the entrance end of column 28 to provide non-turbulent flow therethrough. The sound absorbing structure of column 28 minimizes the noise created by the flow of the gases therethrough. In addition, sleeve 44 may be shifted into the dashed line position of FIG. 1 so that it blocks any flow of gases into passage 32. Thus, the gases cannot contact pipes 82, 84 and 86 to heat the water therein.

Heat exchanged 10 can be used as a water heater or a boiler to meet system requirements. Thus, it can be used in a wide variety of applications where accurate heat transfer control is desired.

It may be desirable to direct only a portion of the gases into passage 32 and to this end, valve member 64 may be located at an intermediate position such as is shown in FIG. 4. The rate of heat transfer to the water in the pipes will be proportionately lessened because of the smaller volume of gases flowing through passage 32. In this way, control of the transfer of heat energy to the water is attained while the complete bypassing action of passage 30 is still available in the event that heat transfer to the pipes is to be immediately interrupted.

An advantage of valve 58 is that it can be positioned to provide a "fail-safe" feature for heat exchanger 10. For instance, when valve member 64 is mounted in the position shown in FIG. 4, it will swing in a clockwise direction under its own weight if the power device coupled to shaft 66 fails for any reason. Thus, member 64 will block opening 68 and all the gases will be exhausted to the atmosphere. The water in the pipes will therefore be protected against overheating and possible structural damage due to excessive pressures will be avoided.

Heat exchanger 10 not only allows efficient heat transfer between the gases and the water but provides an effective bypass for the gases when the heat transfer process is to be intermediately interrupted. Since valve 58 can be selectively actuated, openings 60 and 68 can be readily opened, closed or partially obstructed by valve member 64. Temperature or pressure sensors could be coupled to the water flowing through the pipes and to the power device coupled to shaft 66 for actuating the latter in response to a predetermined temperature or pressure. In this way, automatic control of the heat transfer process occurring in housing 12 can be obtained.

While one embodiment of this invention has been shown and described, it will be apparent that other adaptations and modifications can be made without departing from the true spirit and scope of the invention.

What is claimed:

1. Heat exchange apparatus comprising: means defining first and second fluid passages, the first passage surrounding the second passage and having a coiled tube therein, the tube being disposed about said second passage, whereby a first fluid flowing through said first passage will be in heat exchange relationship to a second fluid flowing through said tube, said passages having respective fluid inlets adjacent to each other; and valve means coupled with said inlets for controlling the flow of said first fluid into each passage and including structure selectively movable across said fluid inlets, whereby heat transfer to said second fluid in the tube may be interrupted by diverting said first fluid from said first passage and into said second passage in bypassing relationship to said first passage.

2. Heat exchange apparatus as set forth in claim 1, wherein said fluid inlets are arranged in side-by-side relationship, said structure being movable along a path permitting fluid flow into said fluid inlets when said structure is intermediate the ends of said path, said structure closing said fluid inlets when it is at respective ends of the path.

3. Heat exchange apparatus as set forth in claim 1, wherein each of said passages has a fluid outlet, and wherein is included a stack communicating with the outlets of said passages, and shiftable means coupled with the stack for selectively closing the latter to fluid in said first passage.

4. Heat exchange apparatus as set forth in claim 1, wherein is included means in said second passage for reducing the noise created by the flow of fluid therethrough and for thermally isolating said first and second passages.

5. Heat exchange apparatus as set forth in claim 1, wherein said passage defining means includes a tube defining said second passage, said tube having an imperforate outer wall and a perforate inner wall spaced inwardly of and surrounded by said outer wall, and thermal insulation and sound absorbing material within the space between said walls.

6. Heat exchange apparatus comprising: a housing having a fluid inlet duct and a fluid outlet duct spaced from said inlet duct; a column within the housing and disposed to present concentrically disposed inner and outer fluid passages having respective outlets in fluid communication with said outlet duct; means defining respective inlets for said inner and outer passages with the inlets being in fluid communication with said inlet duct; a number of fluid carrying pipes disposed in said outer fluid passage and extending along respective helical paths about said column with the paths being concentric to each other, each pipe adapted to be coupled to a source of fluid, whereby fluids flowing through said pipes will be in heat exchange relationship to a fluid flowing through said outer passage; and valve means coupled with said inlet defining means for controlling the flow of fluid into said passages and including structure selectively movable across said inlets, whereby said inner passage may provide a bypass to said outlet duct as to said outer passage for fluid entering said housing through said inlet duct when heat transfer to the fluid in each pipe is to be interrupted.

7. Heat exchange apparatus as set forth in claim 6, wherein is included a tubular, open end partition between each pair of adjacent helical paths respectively, whereby said outer passage is separated into a plurality of conduits, there being a conduit for each pipe respectively.

8. Heat exchange apparatus as set forth in claim 6, wherein is included a tubular, open end member for each pipe respectively, each member including a pair of spaced, imperforate concentric walls, the corresponding pipe being within the spaced between the walls, adjacent members being concentric, relatively shiftable and in relatively close proximity to each other, whereby each member and its pipe defines a removable heat transfer unit within said housing.

9. Heat exchange apparatus as set forth in claim 6, wherein the lengths and diameters of said pipes are substantially equal, the convolutions of each pipe having a spacing relative to the convolutions of the other pipes sufficient to provide substantially uniform heating of the fluid flowing through the pipes.

10. Heat exchange apparatus as set forth in claim 6, wherein is included a tubular partition between each pair of adjacent helical paths respectively, each pipe having longitudinally spaced, laterally extending heat transfer fins thereon, the effective area of said fins per unit length of the inner pipe being greater than the effective fin area of the pipe next adjacent thereto.

11. Heat exchange apparatus as set forth in claim 6, wherein is included a tubular partition between each pair of adjacent helical paths respectively, and a plurality of baffles coupled with said partitions between adjacent convolutions of corresponding pipes to inhibit the flow of fluid longitudinally of said paths and to direct said flow transversely of said paths.

12. Heat exchange apparatus as set forth in claim 6, wherein is included a stack defining said outlet duct and being spaced from and aligned with said column, a sleeve shiftably mounted in said stack for movement longitudinally thereof into and out of engagement with the proximal end of the column, said sleeve having a length greater than the spacing between said stack and said column, and means coupled with the sleeve for moving the same relative to the stack to thereby selectively block said outlet of said outer passage against fluid flow outwardly thereof and into said outlet duct, whereby fluids flowing outwardly of said inner passage will be prevented from flowing into said outer passage.

13. Heat exchange apparatus as set forth in claim 6, wherein said valve means includes a valve having a pair of orifices aligned with the inlets of respective passages, and a shiftable valve member movable into and out of blocking relationship to said orifices to restrict the fluid flow therethrough.

14. Heat exchange apparatus as set forth in claim 6, wherein said valve means includes a valve having a plate provided with a pair of spaced openings therethrough in fluid communication with the inlets of respective passages, a valve member rotatably mounted on said plate and movable relative thereto into and out of any one of a number of operative positions including a first position totally obstructing one opening and permitting the other opening to be unobstructed, a second position totally obstructing the other opening and permitting said one opening to be unobstructed, and intermediate positions partially obstructing both of said openings, and means coupled with the valve member for selectively actuating the same.

References Cited
UNITED STATES PATENTS

| | | | |
|---|---|---|---|
| 1,922,149 | 8/1933 | Baumann | 165—141 |
| 2,096,285 | 10/1937 | Lord et al. | 165—163 |
| 2,670,933 | 3/1954 | Bay | 165—35 |
| 3,235,003 | 2/1966 | Smith | 165—135 |

FOREIGN PATENTS 530,159  12/1940  Great Britain.

ROBERT A. O'LEARY, *Primary Examiner.*

CHARLES SUKALO, *Examiner.*